June 23, 1925.
L. T. COUTY
1,543,152
STABILIZING FLOAT FOR SHIPS
Filed Nov. 13, 1923
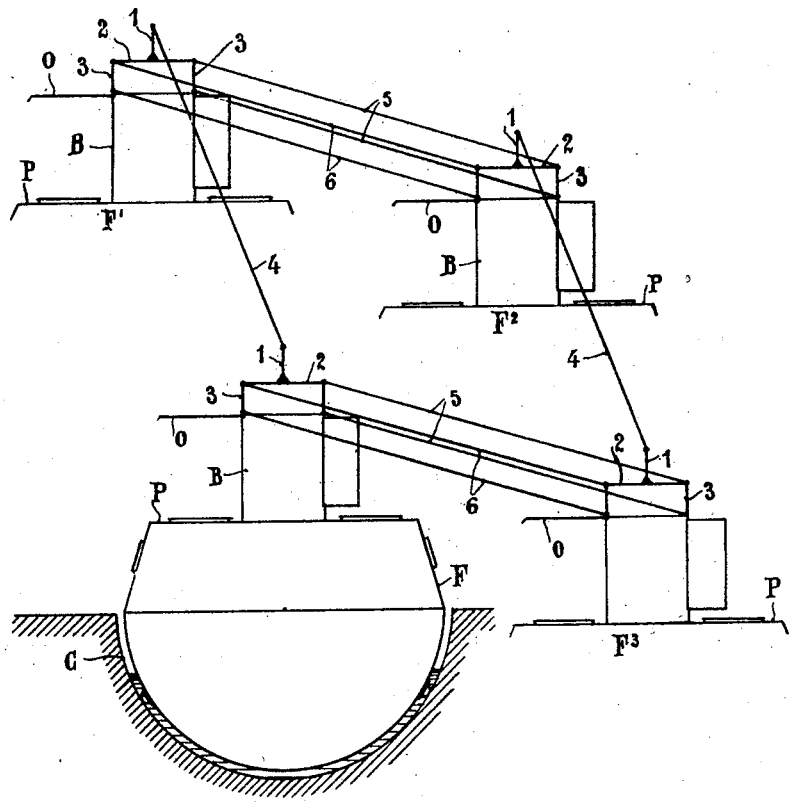

Patented June 23, 1925.

1,543,152

UNITED STATES PATENT OFFICE.

LOUIS THÉOPHILE COUTY, OF TULLE, FRANCE.

STABILIZING FLOAT FOR SHIPS.

Application filed November 13, 1923. Serial No. 674,582.

*To all whom it may concern:*

Be it known that I, LOUIS THÉOPHILE COUTY, a citizen of France, and a resident of Tulle, France, have invented some new and useful Improvements in Stabilizing Floats for Ships, of which the following is a specification.

The invention relates to improvements in floats on ships and its object is to provide a plurality of floats and connecting means between the floats to stabilize them, and prevent sea sickness of passengers, and also adapt the floats for use as mounts for cannon for firing purposes.

One mode of execution of my invention involving a group of four floats of hemispheric section and surmounted for example by decks or platforms and a cylindrical chamber of sufficient size for the accommodation of passengers, is represented schematically in the annexed drawing.

C is the basin, F the float and B the cylindrical chamber surmounting the deck P of the float. The door O of the cover of the cylindrical chamber opens horizontally. The upper parts of the cylindrical chamber of the floats are interconnected by a system of devices comprising supports 1, 2 and 3 and iron rods 4, 5 and 6. The rods 5, of equal length are disposed to the right, at each extremity of the diameter of the cylindrical part perpendicular to these rods, and the rods 6 of the same length as the rods 5, are placed to the left in the same conditions. These double rods at each side, movable in the direction of their length only, the latter being understood from left to right of the drawing, prevent the floats F from rubbing on the basins C when departing from their horizontal position by any reason whatever, and assure a greater stability of the floats in all directions. One single rod at each side were sufficient if a greater number of floats were connected by the device because these floats would be less influenced by any load on one of them and, hence, they would not be drawn or repulsed against the walls of the basin.

The rods 4 are movable only in the direction of their length at right angles to the direction of movement of the rods 5, 6 and hence coact therewith to assure the stability of the floats in all directions.

Therefore the weight of a person entering one of the floats undergoes the resistance of all the floats interconnected by the rods, the result being that the stability of the floats is proportionate to the number of the coupled floats.

The statement made above with regard to floats surmounted by a cylindrical chamber applies equally to floats of any other section. In case of absence, for example, of a cylindrical chamber as platform, use can be made of vertical appropriate supports for coupling the rods according to the method described above.

The utilization of the system according to my invention makes it possible, in any case, to reduce the dimensions of the floats to 1 m. and 25 cm. of diameter, rendering thereby their use practical against sea sickness.

The upper rods 5 and 6 may serve also for the installation of foot-bridges utilizable as means of communication between the floats.

It is also possible to connect the floats of different dimensions provided that the water be on the same level in all the basins, as will be understood.

What I claim, is:—

1. On a ship, floats, cylindrical parts surmounting said floats, supports on said cylindrical parts, single rods fixed to said supports to maintain the floats level in the transverse direction, and double rods to the right and left of the said cylindrical parts to maintain the floats level in the longitudinal direction.

2. On a ship, a plurality of floats, supports on the floats, connecting rods conjugated with the supports in the transverse and the longitudinal direction, single rods in the transverse direction, double rods in the longitudinal direction, to establish a quadrilateral mounting.

3. A ship having a plurality of basins to contain water, floats in said basins buoyed by the water in said basins, structures extending upwardly from said floats and connections between said structures, said structures and said connections coacting to secure simultaneous movement of all of the floats in any direction when any one of them departs from a horizontal position.

In witness whereof I affix my signature.

LOUIS THÉOPHILE COUTY.